US012764008B2

(12) United States Patent
Shibahara et al.

(10) Patent No.: US 12,764,008 B2
(45) Date of Patent: Oct. 13, 2026

(54) SIGNAL PROCESSING APPARATUS AND SIGNAL PROCESSING METHOD

(71) Applicant: NTT, Inc., Tokyo (JP)

(72) Inventors: Koki Shibahara, Musashino (JP); Takayuki Kobayashi, Musashino (JP); Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 2 days.

(21) Appl. No.: 19/108,668

(22) PCT Filed: Sep. 8, 2022

(86) PCT No.: PCT/JP2022/033759
§ 371 (c)(1),
(2) Date: Mar. 4, 2025

(87) PCT Pub. No.: WO2024/053059
PCT Pub. Date: Mar. 14, 2024

(65) Prior Publication Data
US 2026/0089043 A1 Mar. 26, 2026

(51) Int. Cl.
*H04L 27/26* (2006.01)
*H04L 5/00* (2006.01)

(52) U.S. Cl.
CPC ........ *H04L 27/2634* (2013.01); *H04L 5/0098* (2013.01)

(58) Field of Classification Search
CPC .......................... H04L 27/2634; H04L 5/0098
See application file for complete search history.

(56) References Cited

U.S. PATENT DOCUMENTS 8,923,460 B1 * 12/2014 Wang ................. H04B 10/6162 375/350
11,082,135 B2 * 8/2021 Zarubinsky .......... H04B 7/0413
(Continued)

OTHER PUBLICATIONS

David Mansour et al., Unconstrained frequency-domain adaptive filter, IEEE Transactions on Acoustics, Speech, and Signal Processing, Oct. 1982, vol. 30, No. 5, pp. 726-734.
(Continued)

*Primary Examiner* — Freshteh N Aghdam
(74) *Attorney, Agent, or Firm* — Harness, Dickey & Pierce, P.L.C.

(57) ABSTRACT

One aspect of the present invention provides a signal processing apparatus including: filter processors, the number of the filter processors depending on the number of spatial modes of a received optical signal; a sum operator that outputs a sum of outputs of a plurality of the filter processors; an IFFT processor that performs inverse Fourier transform on the sum; an output signal selector that outputs a signal including only a predetermined part of an output of the IFFT processor; an error signal output that outputs, as an error signal, a difference between an output of the output signal selector and a desired signal; and an FFT processor that performs Fourier transform on signals including the error signal, in which the filter processors update a filter weight coefficient by using a signal obtained by performing multiplication only on a predetermined part for an output of the FFT processor and a signal obtained by performing processing including Fourier transform on the received optical signal, and the filter processors output a signal obtained by performing multiplication only on a predetermined part for the filter weight coefficient and the received optical signal.

5 Claims, 7 Drawing Sheets

(56) References Cited

U.S. PATENT DOCUMENTS

| | | | | |
|---|---|---|---|---|
| 12,061,664 | B2 * | 8/2024 | Hode | G01S 7/2886 |
| 2021/0328680 | A1 * | 10/2021 | Ke | H04B 10/5055 |

OTHER PUBLICATIONS

Md. Saifuddin Faruk et al., Adaptive frequency-domain equalization in digital coherent optical receivers, Optics Express, Jun. 20, 2011, vol. 19, No. 13, pp. 12789-12798.

* cited by examiner

| | Conventional technique | | Proposed technique | |
|---|---|---|---|---|
| | The number of multiplications | FFT/IFFT | The number of multiplications | FFT/IFFT |
| 1. Input signal transformation | – | FFT (N/2) × 2D | – | FFT (N) × D |
| 2. Output calculation | $ND^2$ | IFFT (N/2) × D | $ND^2/2$ | IFFT (N) × D |
| 3. Error calculation | – | FFT (N/2) × D | – | FFT (N) × D |
| 4. Update | $ND^2+ND$ | – | $ND^2/2+ND/2$ | – |
| Total | $2ND^2+ND\log_2N$ | | $ND^2+ND/2+3ND/2\log_2N$ | |

SIGNAL PROCESSING APPARATUS AND SIGNAL PROCESSING METHOD

CROSS-REFERENCE TO RELATED APPLICATIONS

This application is a 371 U.S. National Phase of International Application No. PCT/JP2022/033759, filed on Sep. 8, 2022. The entire disclosure of the above application is incorporated herein by reference.

TECHNICAL FIELD

The present invention relates to a technology of a signal processing apparatus and a signal processing method.

BACKGROUND ART

With the start of 5th generation (5G) services, high definition video service distribution, development of Internet of Things (IoT) services, and the like in recent years, communication traffic flowing through an optical network has been increasing. Various measures have been taken in optical networks in response to increasing demand for communication traffic. Some of such measures can be implemented without the need for changing the structure of optical fiber as a transmission path. Specific examples of such measures include increasing functionality of an optical communication system apparatus installed at a terminal station of an optical network. Other specific examples include introducing an optical amplifier or an optical switch.

In optical fiber serving as a base of current high-capacity optical networks, single-mode fiber (SMF) is used in many cases, except for short-distance local networks such as a local area network (LAN). The single-mode fiber has a single core, which serves as a path for optical signals, in a clad. The single-mode fiber is designed to allow only single mode propagation, in a wavelength band such as a C band or an L band used in a high-capacity long-distance optical network. As a result, information that reaches several terabits per second can be stably transferred over a long distance.

In optical networks as described above, a digital coherent transmission technology has been commercially introduced in optical transmission apparatuses of classes such as 100 gigabit per second. The digital coherent transmission technology is a combination of a coherent reception technology and an ultra-high-speed digital signal processing technology. The coherent reception technology is a reception technology for detecting interference light between light on a reception side and local oscillation light. The ultra-high-speed digital signal processing technology is a technology of reproducing, in a digital domain, an envelope waveform of an optical signal and performing, for example, equalization of waveform distortion generated in a transmission path or a transmitter/receiver.

By using the digital coherent transmission technology, it is possible to remove waveform distortion effectively on the basis of a physical mechanism that causes waveform distortion. Thus, optical transceivers having properties including small size, low cost, and low power consumption have been provided. With the advent of the digital coherent transmission technology, it is possible to improve reception sensitivity in optical transmission in a high-capacity optical network. Furthermore, in the digital coherent transmission technology, information is contained in an amplitude, phase, or polarization of an optical carrier wave, and this makes it possible to dramatically improve the efficiency of information transmission.

Polarization-multiplexed optical transmission is a specific example of a transmission method using the digital coherent transmission technology in which information is contained in a polarization. In polarization-multiplexed optical transmission, two orthogonal polarization modes are used for single-mode fiber. In polarization-multiplexed optical transmission, a different piece of information can be contained in each one of polarizations having an orthogonal relationship. In a case where polarization-multiplexed optical transmission is performed, polarizations having an orthogonal relationship are complicatedly mixed in an optical transmission path, and orthogonal axes of the polarization modes change at a high speed. Thus, it is difficult to track such polarizations using an optical apparatus. Thus, a receiving apparatus that supports polarization diversity receives a polarization multiplexed optical signal in which polarizations having an orthogonal relationship are mixed, converts the received polarization multiplexed optical signal into a digital signal, and uses digital signal processing to separate the polarizations from each other. This separation processing can be modeled as a 2×2 multiple-input multiple-output (MIMO) system used in a wireless communication system. As a result, information for each polarization can be extracted from the separated signals. As a result, communication between communication apparatuses is established.

Other specific examples of the transmission method using the digital coherent transmission technology include mode-multiplexed optical transmission using a plurality of spatial modes (hereinafter also referred to as "modes") in multimode optical fiber. In mode-multiplexed optical transmission, fiber having a larger core diameter than single-mode fiber is used as a transmission medium. As a result, a plurality of modes can be excited also in an existing wavelength band such as a C band. Thus, a different piece of information can be contained in each mode. Also in mode-multiplexed optical transmission, similarly to polarization-multiplexed optical transmission, mode-multiplexed optical signals are complicatedly mixed during propagation through multimode optical fiber. A receiving apparatus that supports mode diversity receives the mode-multiplexed optical signals, and converts the received optical signals into digital signals. Then, the optical signals are separated using MIMO signal processing of a scale that depends on the number of modes to be excited.

As a more specific example, few-mode fiber is considered in which two linearly polarized (LP) modes are excited. In the few-mode fiber for two LP modes, an LP01 mode, which is as a fundamental mode, and an LP11 mode, which is a higher-order mode, are excited. Furthermore, two degenerate modes (these are referred to as LP11a and LP11b, respectively) of the LP11 mode and polarization modes (these are referred to as X polarization and Y polarization, respectively) of each mode are utilized. As a result, in the few-mode fiber for two LP modes, a different piece of information can be contained in each of six spatial modes in total: LP01X, LP01Y, LP11aX, LP11aY, LP11bX, and LP11bY. Therefore, if a nonlinear optical effect of the optical fiber is ignored, the few-mode fiber for two LP modes can, in principle, achieve transmission capacity three times larger than that of existing single-mode fiber.

As described above, a different piece of independent information is contained in propagation light in each spatial mode in multimode optical fiber, and this allows the transmission capacity per optical fiber to be improved in accordance with the number of spatial modes to be excited.

In MIMO signal processing, it is necessary to compensate for not only coupling between spatial modes but also a phenomenon (dispersion) caused by a signal pulse delay difference on a time axis. Dispersion is a phenomenon caused by a group delay difference between waveguide modes. Specific examples of dispersion include polarization mode dispersion generated in single-mode optical fiber and mode dispersion generated in multimode optical fiber. In general, dispersion has a property of accumulating in accordance with a transmission distance. Thus, in MIMO signal processing for an optical signal transmitted over a long distance, MIMO signal processing that has a finite impulse response (FIR) of the number of multipliers (the number of taps) sufficient to cover temporal spread of signal pulses due to dispersion is required. Hereinafter, such MIMO signal processing will be referred to as MIMO-FIR signal processing. As described above, the required number of taps increases in accordance with the transmission distance. Thus, the scale of a signal processing circuit may increase in accordance with the transmission distance.

As an effective technique for reducing the scale of the signal processing circuit for MIMO-FIR signal processing, frequency domain MIMO-FIR signal processing in which signal processing in a time domain is performed in a frequency domain is known (see Non Patent Literature 1 and Non Patent Literature 2). The frequency domain MIMO-FIR signal processing is performed on the basis of the fact that a circular convolution operation is processing equivalent to an element product operation in the frequency domain. In the frequency domain MIMO-FIR signal processing, processing using fast Fourier transform is applied so that the signal processing scale of the MIMO-FIR signal processing can be effectively reduced. By the MIMO-FIR signal processing, it is possible to collectively compensate for separation of coupling between spatial modes including polarizations and dispersion generated in transmission path fiber.

CITATION LIST

Non Patent Literature

Non Patent Literature 1: Mansour, D., & Gray, A. (1982). Unconstrained frequency-domain adaptive filter. IEEE Transactions on Acoustics, Speech, and Signal Processing, 30 (5), 726-734. Non Patent Literature 2: Md. Saifuddin Faruk and Kazuro Kikuchi, “Adaptive frequency-domain equalization in digital coherent optical receivers,” Opt. Express 19, 12789-12798 (2011)

SUMMARY OF INVENTION

Technical Problem

In frequency domain MIMO-FIR signal processing (e.g., the method described in Non Patent Literature 2) that has been proposed, sampling signals on a space axis and a time axis are independently treated as digital input signals of fast Fourier transform. For example, input signals sampled at a twofold oversampling rate are classified into four types: u_ox, u_ex, u_oy, and u_ey, and fast Fourier transform processing is performed on each of the four types. The u_ox, u_ex, u_oy, and u_ey represent an X-polarization signal at an odd sampling timing, an X-polarization signal at an even sampling timing, a Y-polarization signal at an odd sampling timing, and a Y-polarization signal at an even sampling timing, respectively.

However, in a case where input signals are divided at odd and even sampling timings as in the above processing, known information such as signal allocation in the frequency domain cannot be sufficiently utilized. For example, with development of the digital coherent transmission technology, optical signal spectrum shaping is generally performed in a current high-speed optical signal generation circuit. In particular, by performing spectrum shaping based on Nyquist filter processing having a roll-off factor that asymptotically approaches 0, it is possible to allocate wavelength multiplexed signals in high density. Thus, there is a disadvantage that, for signals sampled at a speed of the oversampling rate of 1 or more, signals of different sampling timings are independently processed, and thus information regarding localization of signal power on a frequency axis is lost.

In view of the above circumstances, an object of the present invention is to provide a technology that allows for a reduction in signal processing scale of frequency domain MIMO-FIR signal processing.

Solution to Problem

One aspect of the present invention provides a signal processing apparatus including: filter processors, the number of the filter processors depending on the number of spatial modes of a received optical signal; a sum operator that outputs a sum of outputs of a plurality of the filter processors; an IFFT processor that performs inverse Fourier transform on the sum; an output signal selector that outputs a signal including only a predetermined part of an output of the IFFT processor; an error signal output that outputs, as an error signal, a difference between an output of the output signal selector and a desired signal; and an FFT processor that performs Fourier transform on signals including the error signal, in which the filter processors update a filter weight coefficient by using a signal obtained by performing multiplication only on a predetermined part for an output of the FFT processor and a signal obtained by performing processing including Fourier transform on the received optical signal, and the filter processors output a signal obtained by performing multiplication only on a predetermined part for the filter weight coefficient and the received optical signal.

One aspect of the present invention provides a signal processing method performed by a signal processing apparatus including filter processors, the number of the filter processors depending on the number of spatial modes of a received optical signal, the signal processing method including: outputting a sum of outputs of a plurality of the filter processors; performing inverse Fourier transform on the sum; outputting an output signal including only a predetermined part of an output of the inverse Fourier transform; outputting, as an error signal, a difference between the output signal and a desired signal; and performing Fourier transform on signals including the error signal, in which the filter processors update a filter weight coefficient by using a signal obtained by performing multiplication only on a predetermined part for a result obtained by performing Fourier transform on the signals including the error signal and a signal obtained by performing processing including Fourier transform on the received optical signal, and the filter processors output a signal obtained by performing multiplication only on a predetermined part for the filter weight coefficient and the received optical signal.

Advantageous Effects of Invention

The present invention allows for a reduction in signal processing scale of frequency domain MIMO-FIR signal processing.

DESCRIPTION OF EMBODIMENTS

The present invention is a technology applied to an optical signal receiving apparatus that receives an optical signal. The optical signal receiving apparatus includes, for example, an optical front-end, an analog-to-digital converter, and a DSP processor. The optical front-end converts an optical signal that has arrived via a transmission path into an analog electrical signal. The analog-to-digital converter converts an analog electrical signal into a digital electrical signal. The DSP processor performs digital signal processing (DSP) to decode a digital electrical signal. The DSP processor includes, for example, an adaptive filter equalizer (adaptive filter equalization circuit). A signal processing apparatus of the present invention may be provided, as such an adaptive filter equalizer, in the DSP processor.

In the following description, the number of spatial modes is D (D is a natural number). For simplicity, an oversampling rate of 2 is assumed as a sampling rate of a received optical signal into a digital signal. Note that an optional oversampling rate of 1 or more (e.g., fractionally spaced sampling) may be used. Frequency domain MIMO-FIR signal processing uses an overlap-save method, with a block length of N (N is a natural number) and an overlap ratio of 50%. Note that these configurations are only specific examples, and other configurations may be applied. In general, the number of powers of 2, which is sufficiently larger than 1 that allows for efficient execution of Fourier transform processing, is used for N by fast Fourier transform processing, and the assumption is also used in the following description. The description "x_a" indicates that an index "a" is attached to the lower right of x, and the description "x^a" indicates that an index "a" is attached to the upper right of x.

Figure 7:
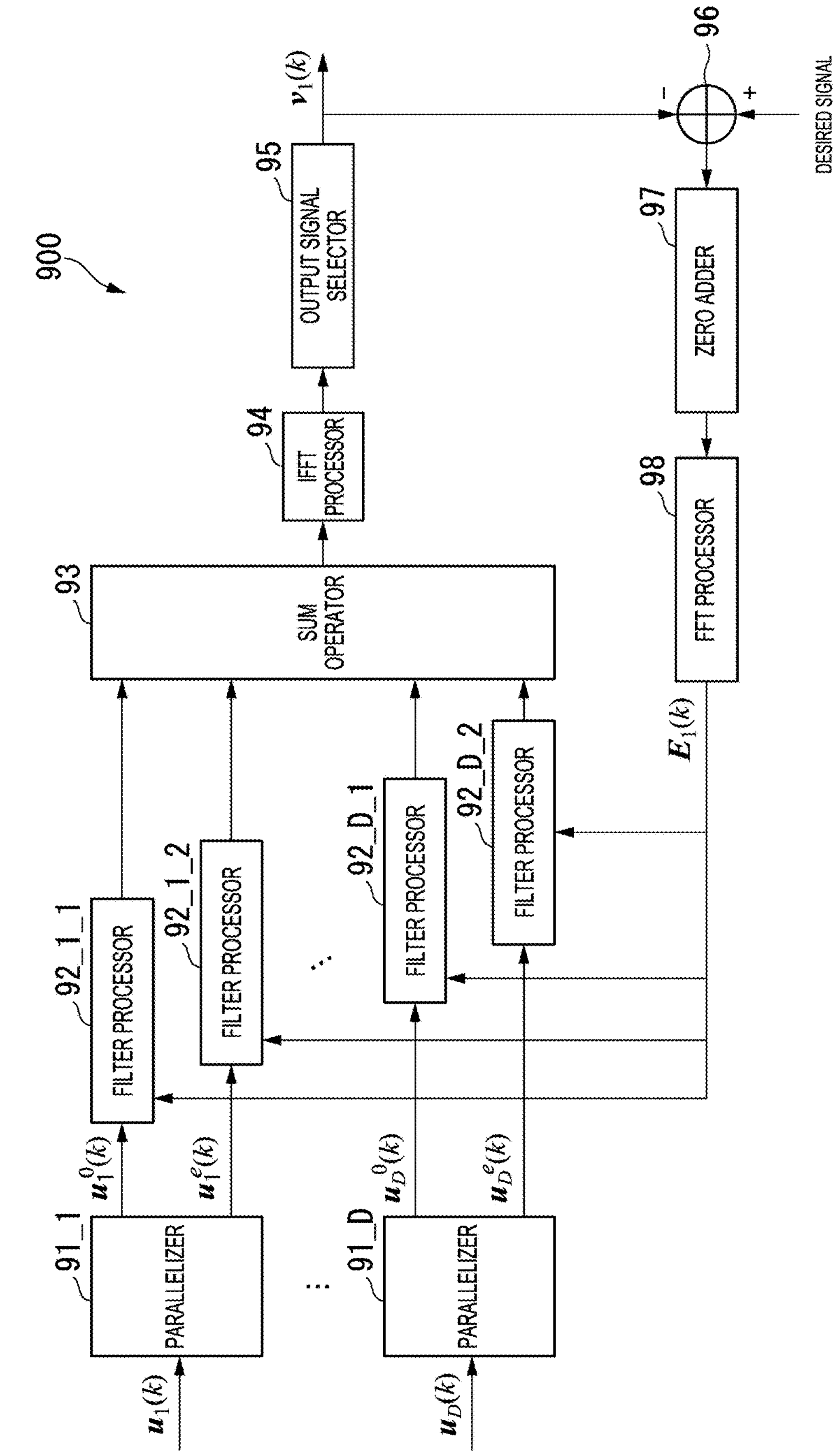
FIG. 7 is a diagram schematically illustrating a configuration of a conventional signal processing apparatus 900.

First, for understanding the configuration of the present invention, the configuration of a conventional signal processing apparatus will be described. FIG. 7 is a diagram schematically illustrating a configuration of a conventional signal processing apparatus 900. The signal processing apparatus 900 illustrated in FIG. 7 is a part of an apparatus that executes frequency domain MIMO-FIR signal processing. The signal processing apparatus 900 performs frequency domain MIMO-FIR signal processing on input signals u_1 (*k*) to u_D(k). Through this processing, the signal processing apparatus 900 outputs an estimate value v_1 (k) for spatial channel 1.

Here, u_i is a received signal for spatial mode i (1≤i≤D). k represents a block number, and in a case where the meaning is clear, the description thereof will be omitted. The signal processing apparatus 900 outputs an estimate value v_i for spatial channel i (1≤i≤D). A signal processing apparatus that performs frequency domain MIMO-FIR signal processing includes i signal processing apparatuses 900 illustrated in FIG. 7. The signal processing apparatuses 900 have similar configurations regardless of the value of i, and the signal processing apparatus 900 in the case of i=1 will be described as an example in the following description.

A parallelizer 91 is provided for each received signal u_i. The parallelizers 91_i divide the received signals u_i into u_i^o corresponding to odd sampling timing and u_i^e corresponding to even sampling timing. One filter processor 92 is provided for each of the odd sampling timing of the received signals u_i and the even sampling timing of the received signals u_i. The filter processors 92 execute filter processing. A sum operator 93 outputs the sum of output signals from all the filter processors 92.

An IFFT processor 94 executes inverse Fourier transform processing on an output signal of the sum operator 93. A processing block size of the inverse Fourier transform in the IFFT processor 94 is N/2. An output signal selector 95 stores components of index numbers from 1+N/4 to N/2 of the output of the IFFT processor 94, and discards the other components. The output signal selector 95 finally outputs v_1. In general, the stored components are components in which results of a circular convolution and a linear convolution agree with each other.

An error signal output 96 outputs a difference between an output signal v_1 and a desired signal as an error signal. A zero adder 97 adds N/4 "0"s to the beginning of the error signal. An FFT processor 98 performs Fourier transform processing of size N/2, and outputs an error signal E_1 in the frequency domain. The filter processor 92 uses the error signal E_1 in the frequency domain to update a filter weight coefficient.

Figure 8:
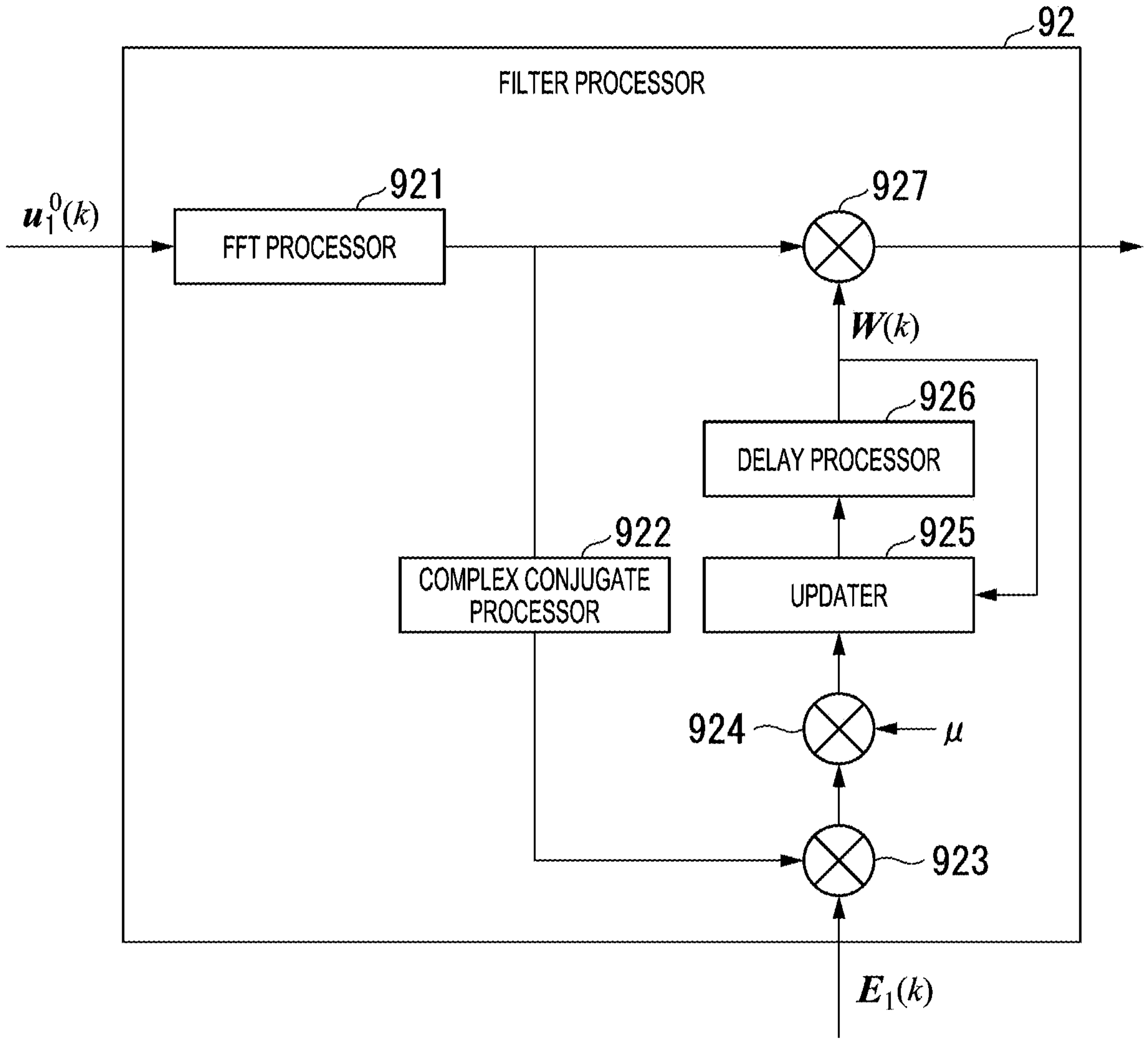
FIG. 8 is a diagram schematically illustrating a configuration of a filter processor 92 in the conventional signal processing apparatus 900.

FIG. 8 is a diagram schematically illustrating a configuration of the filter processor 92 in the conventional signal processing apparatus 900. For a signal to be input, u_1^o is taken as an example. The configuration of the filter processor 92 illustrated in FIG. 8 is common to a filter processor 92_i_1 and a filter processor 92_i_2 (1≤i≤D) illustrated in FIG. 7.

The filter processor 92 performs filter processing on the input signal u_1^o. The filter processor 92 performs processing of updating the filter weight coefficient for the input signal u_1^o.

An FFT processor 921 converts the input signal u_1^o into a frequency domain signal. The FFT processor 921 performs Fourier transform processing of size N/2. A complex conjugate processor 922 converts, into a complex conjugate signal, the frequency domain signal output from the FFT processor 921. A multiplication processor 923 outputs an element product of the complex conjugate signal and the error signal E_1 in the frequency domain. A multiplication processor 924 outputs a product of the element product and a step size parameter μ. An updater 925 updates the filter weight coefficient by using the sum of W(k), which is the filter weight coefficient of the previous block number, and the output of the multiplication processor 924. A delay processor 926 gives a delay to the updated filter weight coefficient. A multiplication processor 927 outputs an element product of the updated filter weight coefficient and an output of the FFT processor 921. The output of the multiplication processor 927 is an output signal of the filter processor 92.

Note that, in the above description, an unconstrained frequency-domain least mean square (LMS)-type method (Non Patent Literature 1) is used as an example of a filter coefficient update algorithm of the filter processor 92. However, any filter coefficient update algorithm may be applied to the filter processor 92. For example, a constrained frequency-domain LMS-type method may be applied, or a frequency-domain recursive least square (RLS) method (Reference Literature) may be applied.

Reference Literature: Zhiqun Yang, Jian Zhao, Neng Bai, Ezra Ip, Ting Wang, Zhihong Li, and Guifang Li, "Experimental demonstration of adaptive VFF-RLS-FDE for long-distance mode-division multiplexed transmission," Opt. Express 26, 18362-18367 (2018)

Figure 1:
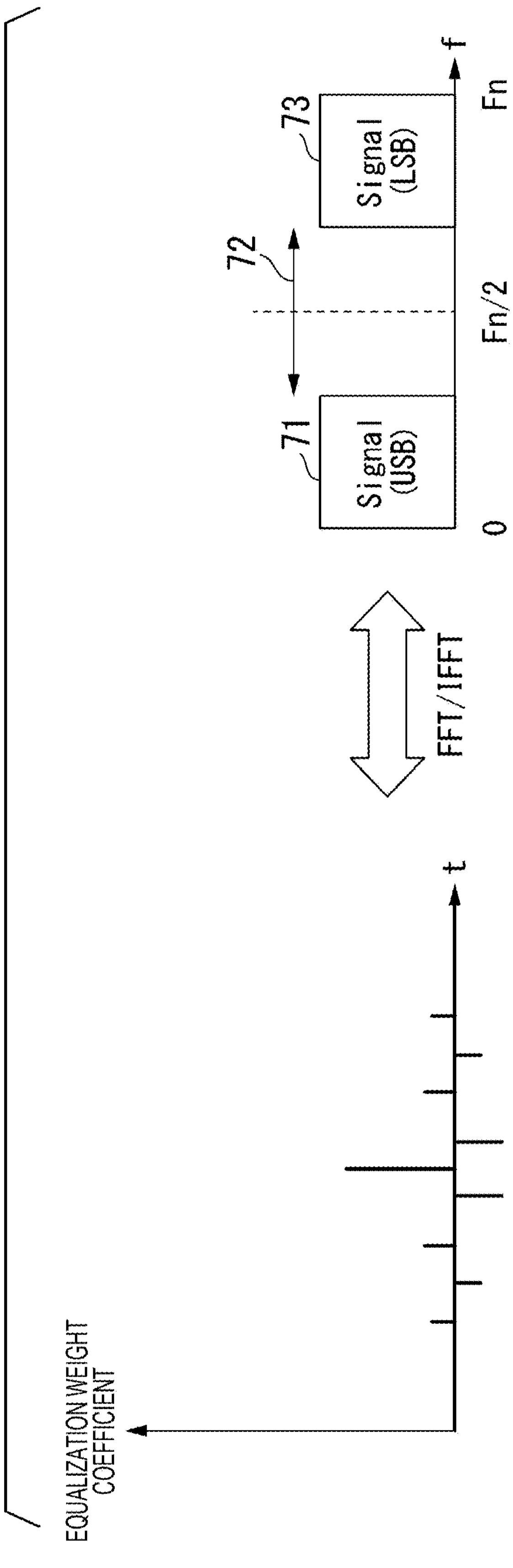
FIG. 1 is a diagram schematically illustrating the present invention.

Next, an outline of the present invention will be described. The signal processing apparatus according to the present invention is applied to frequency-domain equalization (FDE). FIG. 1 is a diagram schematically illustrating the present invention. In a conventional technology of FDE in which a twofold oversampling signal is input, as described above, processing is performed in each of a configuration for processing a signal at an odd sampling timing and a configuration for processing a signal at an even sampling timing. Thus, prior information of a signal band cannot be utilized. The signal processing apparatus of the present invention performs processing by taking advantage of properties on the frequency axis of a signal. Specifically, as illustrated in FIG. 1, the processing is performed for a band 71 and a band 73 in which a signal exists, but the processing is not performed for a band 72 in which no signal exists. Such a configuration allows for a reduction in calculation load.

Figure 2:
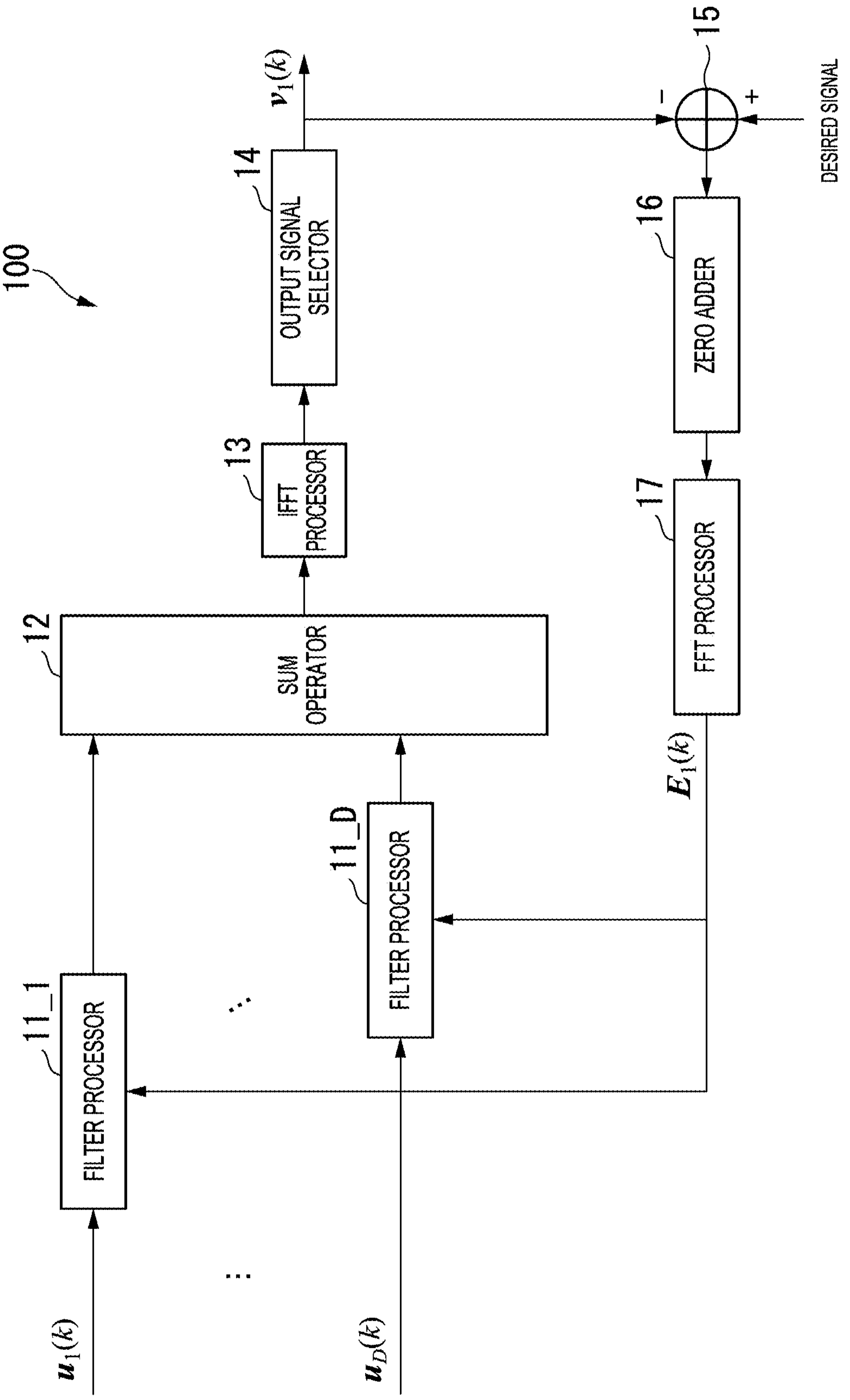
FIG. 2 is a diagram schematically illustrating a configuration of a signal processing apparatus 100 of the present invention.

Next, the signal processing apparatus of the present invention will be described. FIG. 2 is a diagram schematically illustrating a configuration of a signal processing apparatus 100 of the present invention. The signal processing apparatus 100 illustrated in FIG. 2 is a part of an apparatus that executes frequency domain MIMO-FIR signal processing. The signal processing apparatus 100 performs frequency domain MIMO-FIR signal processing on input signals u_1(*k*) to u_D(k). Through this processing, the signal processing apparatus 100 outputs an estimate value v_1(*k*) for spatial channel 1. As described above, the signal processing apparatus 100 outputs an estimate value v_i for spatial channel i (1≤i≤D). A signal processing apparatus that performs frequency domain MIMO-FIR signal processing includes i signal processing apparatuses 100 illustrated in FIG. 2. The signal processing apparatuses 100 have similar configurations regardless of the value of i, and the signal processing apparatus 100 in the case of i=1 will be described as an example in the following description.

A filter processor (filter) 11 is provided for each received signal u_i. The filter processor 11 executes filter processing on the received signals u_i. A sum operator 12 outputs the sum of output signals from all the filter processors 11. An IFFT processor 13 executes inverse Fourier transform processing in which the block size is N on an output signal of the sum operator 12. An output signal selector 14 stores some of components determined in advance in an output of the IFFT processor 13, and discards the other components. The output signal selector 14 finally outputs v_1. The components stored in the output signal selector 14 (some of output components determined in advance) are, for example, components of index numbers, the index numbers being selected one every (m−1) index numbers, among index numbers 1+N/2 to N in which results of a circular convolution and a linear convolution agree with each other (m is an oversampling rate). In a case where the oversampling rate is 2, components of index numbers, the index numbers being selected one every other index numbers, are stored in the output signal selector 14. In this case, a signal having components of N/4 index numbers is stored and output as an output signal. For example, in a case of N=64, the output signal selector 14 selects and stores only components of 16 index numbers 33, 35, 37, 63, and outputs them as the output signal v_1.

An error signal output 15 outputs a difference between the output signal v_1 and a desired signal as an error signal. A zero adder 16 adds N/2 "0"s to the beginning of the error signal. Furthermore, the zero adder 16 allocates components of index numbers 1 to N/4 of the error signal to every other index number. "0" is allocated to index numbers to which the components of the error signal have not been allocated (skipped index numbers). An FFT processor 17 performs Fourier transform processing of size N, and outputs an error signal E_1 in the frequency domain. The filter processor 11 uses the error signal E_1 in the frequency domain to update a filter weight coefficient.

Figure 3:
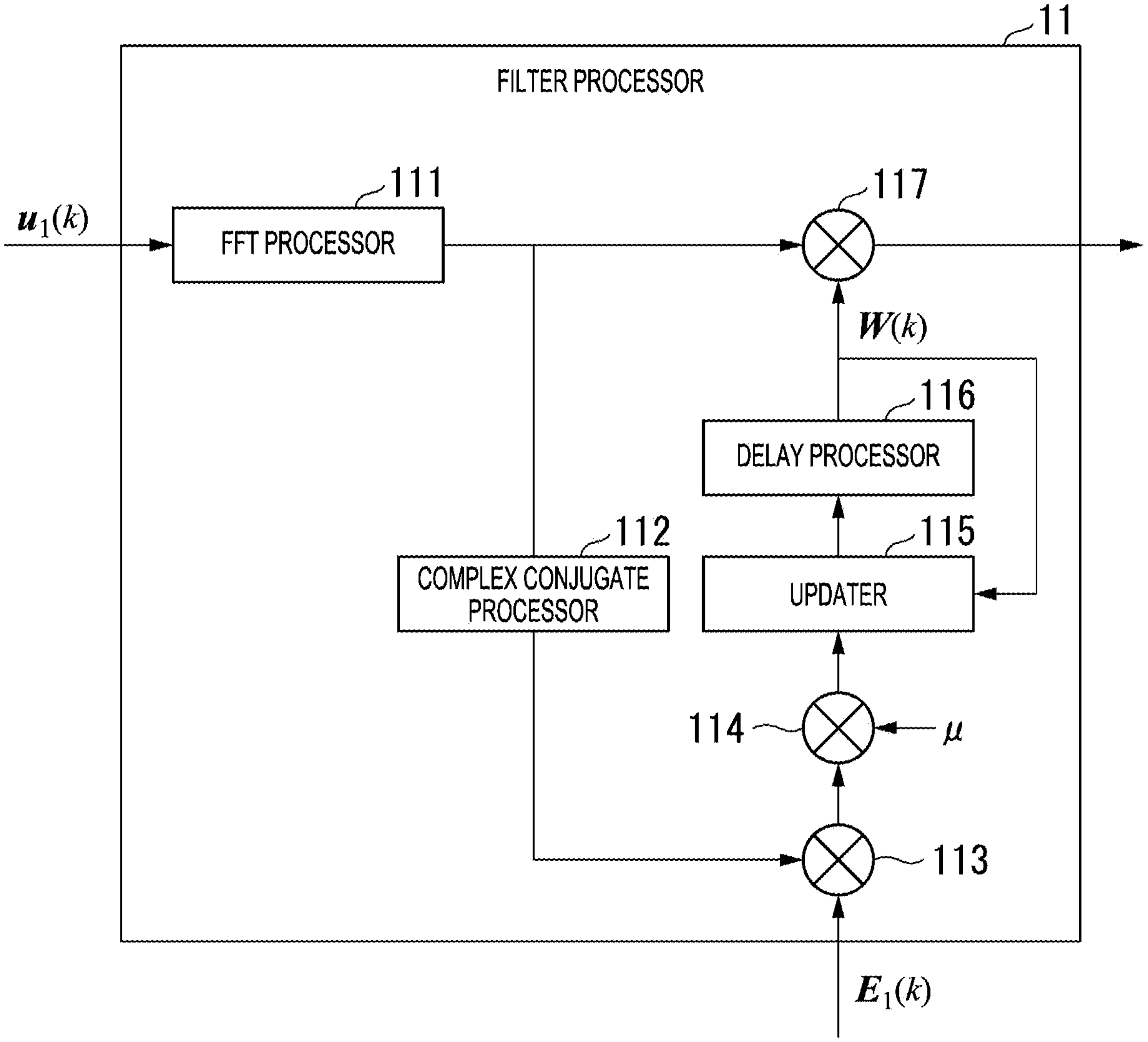
FIG. 3 is a diagram schematically illustrating a configuration of a filter processor 11 in the signal processing apparatus 100.

FIG. 3 is a diagram schematically illustrating a configuration of the filter processor 11 in the signal processing apparatus 100. For a signal to be input, u_1 is taken as an example. The configuration of the filter processor 11 illustrated in FIG. 3 is common to filter processors 11_i (1≤i≤D) illustrated in FIG. 2. The filter processor 11 performs filter processing on the input signal u_1. The filter processor 11 performs processing of updating the filter weight coefficient for the input signal u_1.

An FFT processor 111 converts the input signal u_1 into a frequency domain signal. The FFT processor 111 performs Fourier transform processing of size N. A complex conjugate processor 112 converts the frequency domain signal output from the FFT processor 111 into a complex conjugate signal. A selection-type multiplication processor 113 outputs an element product of the complex conjugate signal and the error signal E_1 in the frequency domain. Frequency domain multiplication processing in the selection-type multiplication processor 113 is selectively performed only on frequency domain signals in which components of M (M≤N) index numbers have been excluded. The selection-type multiplication processor 113 performs multiplication processing only on N/2 signals in which components of index numbers from 1+N/4 to 3N/4 have been excluded, for example. The selection-type multiplication processor 113 does not calculate element products for index numbers from 1+N/4 to 3N/4 but represents the element products by using a predetermined value. For example, the selection-type multiplication processor 113 sets the value of these element products to 0.

A selection-type multiplication processor 114 outputs a product of an element product output from the selection-type multiplication processor 113 and a step size parameter u. An updater 115 updates the filter weight coefficient by using the sum of W(k), which is the filter weight coefficient of the previous block number, and the output of the selection-type multiplication processor 114. A delay processor 116 gives a delay to the updated filter weight coefficient.

A selection-type multiplication processor 117 outputs an element product of the updated filter weight coefficient and an output of the FFT processor 111. The output of the selection-type multiplication processor 117 is an output signal of the filter processor 11. Frequency domain multiplication processing in the selection-type multiplication processor 117 is selectively performed only on frequency domain signals in which components of M (M≤N) index numbers have been excluded. Element products for components of the M index numbers that have been removed are not calculated but represented using a predetermined value. For example, the selection-type multiplication processor 117 sets the value of these element products to 0.

A supplementary description will be given on selection of the M index numbers in the selection-type multiplication processor 113, the selection-type multiplication processor 114, and the selection-type multiplication processor 117. In a case where a value that asymptotically approaches 0 (e.g., 0.01) is used as a roll-off factor of Nyquist filter processing in optical signal spectrum shaping, the index numbers for which an element product operation is not performed in the selection-type multiplication processor are from 1+N/4 to 3N/4, that is, M=N/2 index numbers. This is because signal components corresponding to the index numbers from 1+N/4 to 3N/4 correspond to components outside the signal band in the frequency domain. For this reason, the above-described processing is appropriate as processing for a signal subjected to spectrum shaping in advance.

Note that the M indexes for which multiplication processing is to be performed are common to the selection-type multiplication processor 113, the selection-type multiplication processor 114, and the selection-type multiplication processor 117. In the above description, an unconstrained frequency-domain LMS-type method (Non Patent Literature 1) is used as an example of a filter coefficient update algorithm of the filter processor 11. However, any filter coefficient update algorithm may be applied to the filter processor 11. For example, a constrained frequency-domain LMS-type method may be applied, or a frequency-domain RLS method (Reference Literature) may be applied. In addition, similar application is possible also in a function of selecting index numbers for which multiplication processing is to be performed in each of the selection-type multiplication processors (113, 114, and 117).

Figures 4, 5:
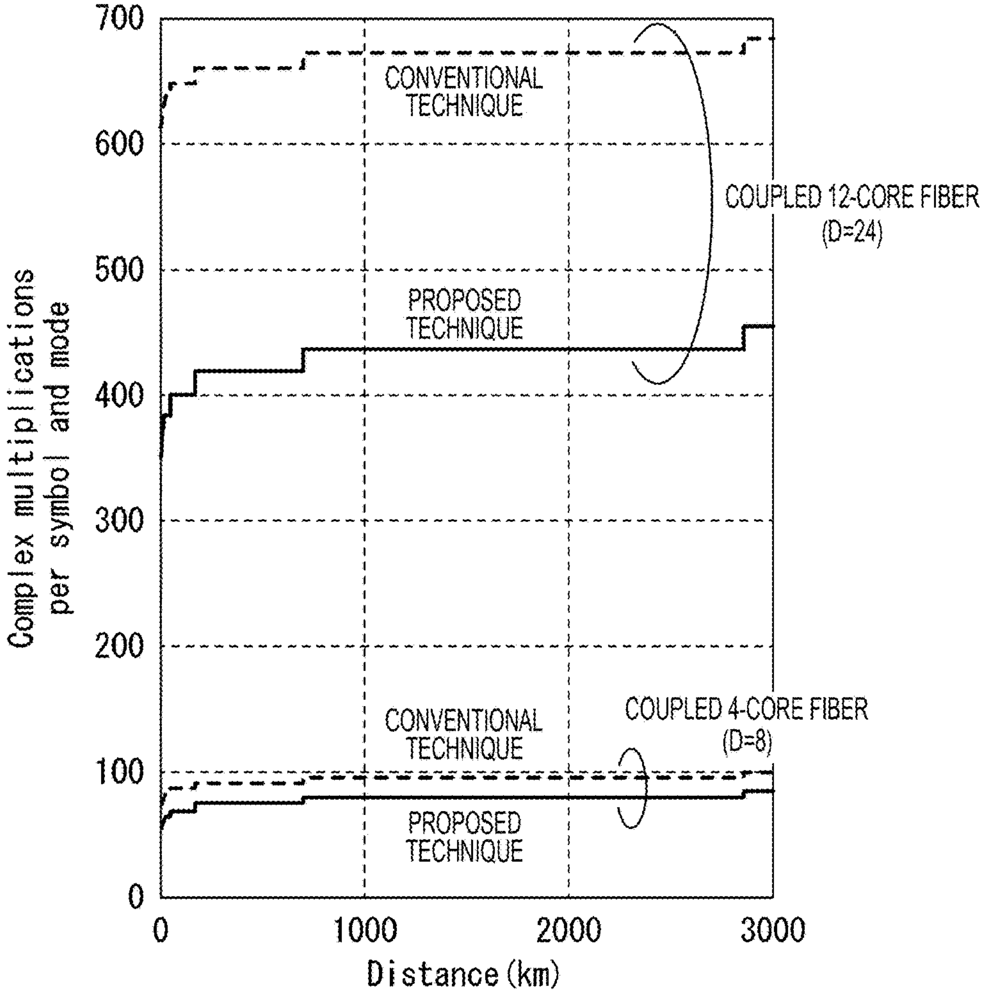
FIG. 4 is a diagram illustrating a calculation amount.
FIG. 5 is a diagram illustrating an effect of reducing the calculation amount in accordance with a transmission distance.

FIG. 4 is a diagram illustrating a calculation amount. A conventional technique column shows the number of multiplication operations and the number of pieces of Fourier transform processing (including inverse Fourier transform processing) required for each piece of processing (input signal transformation, output calculation, error calculation, and update) in the signal processing apparatus 900 of the conventional technology described with reference to FIGS. 7 and 8. A proposed technique column shows the number of multiplication operations and the number of pieces of Fourier transform processing (including inverse Fourier transform processing) required for each piece of processing (input signal transformation, output calculation, error calculation, and update) in the signal processing apparatus 100 described with reference to FIGS. 2 and 3. N is the block size, and D is the number of spatial modes (including polarizations). This calculation amount is an amount in a case of FDE-LMS without a constraint condition. The calculation amount shown as the number of multiplications does not include multiplications performed in Fourier transform and inverse Fourier transform. As for the value shown as the sum, division by ND/4 is performed in a case of transformation into a number per mode or symbol. As illustrated in FIG. 4, in the signal processing apparatus 100 of the present invention, the calculation amount can be reduced as compared with the conventional technique. Furthermore, it is possible to reduce the calculation amount more significantly in a multi-spatial mode multiplexing system.

FIG. 5 is a diagram illustrating an effect of reducing the calculation amount in accordance with a transmission distance. As illustrated in FIG. 5, the obtained effect of reduction in calculation amount was about 16% in coupled 4-core fiber, and the obtained effect of reduction in calculation amount was about 35% in coupled 12-core fiber. Note that the number of complex multiplications was used as a parameter representing the calculation amount, and the number of complex multiplications required for fast (inverse) Fourier transform processing on a signal in which the block size is N (N is the power of 2) at that time was set to N/2*log2(N). In addition, coupled multicore fibers having 4 cores (transmission path 1) and 12 cores (transmission path 2) are assumed as types of optical fiber constituting optical transmission paths, in which a symbol rate, an oversampling rate, and a spatial mode dispersion coefficient of the signal are 10 GBaud, 2, and 20 ps/(km)^1/2, respectively.

Figure 6:
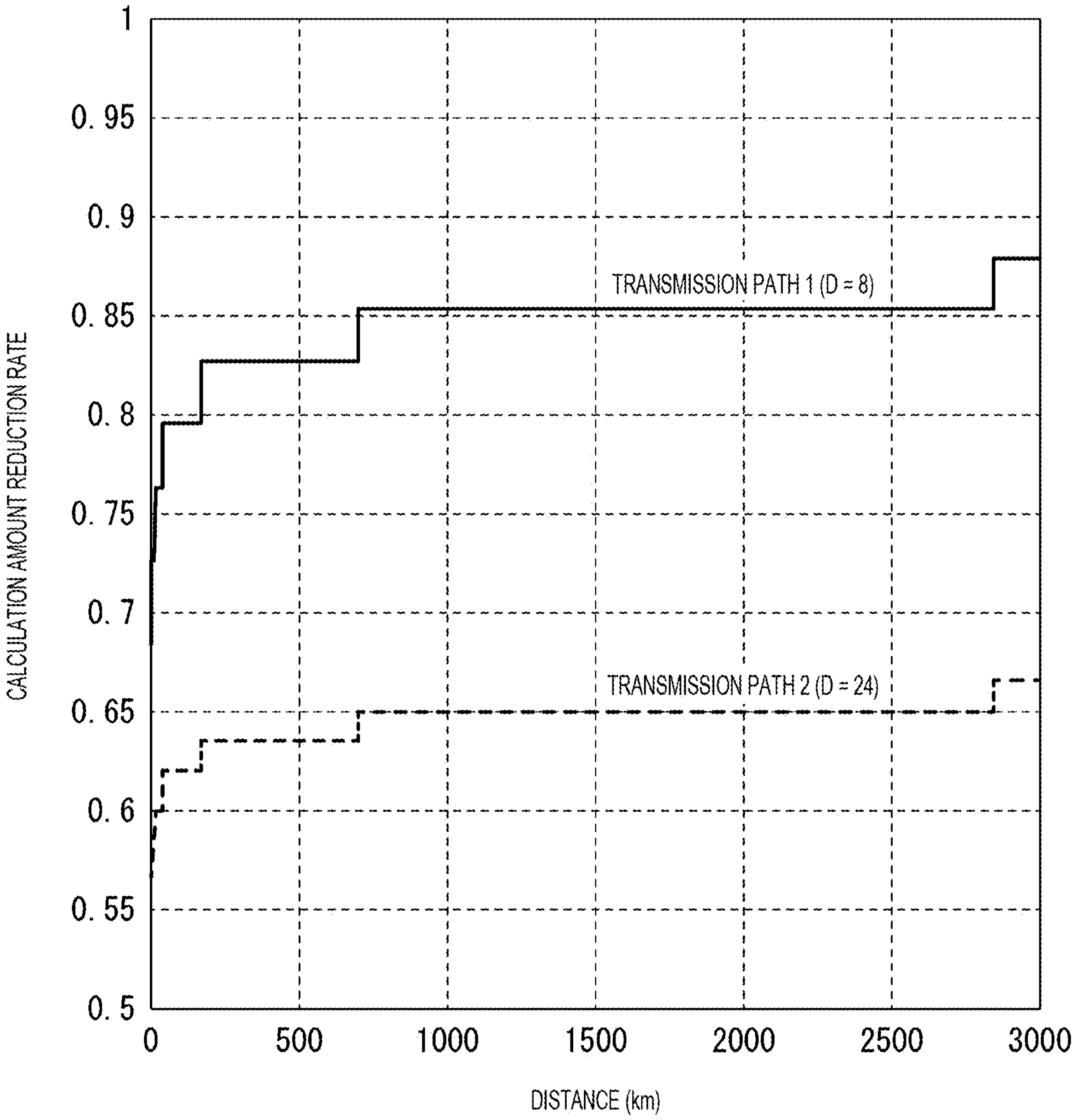
FIG. 6 is a diagram illustrating a calculation amount reduction rate according to the present invention.

FIG. 6 is a diagram illustrating a calculation amount reduction rate according to the present invention. Note that the calculation amount reduction rate is defined as a value obtained by dividing the amount of signals required for the proposed technique by the signal processing scale of the conventional technique. The calculation amount reduction rate shows a stepwise transition indicating that the block length based on fast Fourier transform processing transitions to the power of 2. It can be seen that the calculation amount can be reduced by the signal processing apparatus 100 of the present invention in each of transmission path 1 and transmission path 2. In particular, when the number of spatial modes D is larger, the signal processing apparatus 100 of the present invention yields a greater effect on the calculation amount reduction rate.

The processing of the signal processing apparatus 100 described above may be implemented by using a processor such as a central processing unit (CPU) and a memory, or may be implemented by hardware. In a case where a processor and a memory are used, the processing is implemented by the processor executing a program. In a case of implementation using hardware, all or some pieces of the above-described processing may be implemented by using hardware such as an application specific integrated circuit (ASIC), a programmable logic device (PLD), or a field programmable gate array (FPGA). The above program may be recorded on a computer-readable recording medium. Examples of the computer-readable recording medium include a portable medium such as a flexible disk, a magneto-optical disc, a ROM, a CD-ROM, or a semiconductor storage device (e.g., solid state drive (SSD)), or a storage device such as a hard disk or a semiconductor storage device built in a computer system. The above program may be transmitted via a telecommunication line.

Although the embodiment of the present invention has been described above in detail with reference to the drawings, the specific configuration is not limited to the embodiment, and includes design and the like within a range not departing from the gist of the present invention.

INDUSTRIAL APPLICABILITY

The present invention is applicable to an optical signal receiver using frequency domain MIMO-FIR signal processing.

REFERENCE SIGNS LIST

100 . . . Signal processing apparatus
11 . . . Filter processor
12 . . . Sum operator
13 . . . IFFT processor
14 . . . Output signal selector
15 . . . Error signal output
16 . . . Zero adder
17 . . . FFT processor
111 . . . FFT processor
112 . . . Complex conjugate processor
113 . . . Selection-type multiplication processor
114 . . . Selection-type multiplication processor
115 . . . Updater
116 . . . Delay processor
117 . . . Selection-type multiplication processor

The invention claimed is:

1. A signal processing apparatus comprising:

filter processors, the number of the filter processors depending on the number of spatial modes of a received optical signal;

a sum operator that outputs a sum of outputs of a plurality of the filter processors;

an IFFT processor that performs inverse Fourier transform on the sum;

an output signal selector that outputs a signal including only a predetermined part of an output of the IFFT processor;

an error signal output that outputs, as an error signal, a difference between an output of the output signal selector and a desired signal; and an FFT processor that performs Fourier transform on signals including the error signal, wherein the filter processors update a filter weight coefficient by using a signal obtained by performing multiplication only on a predetermined part for an output of the FFT processor and a signal obtained by performing processing including Fourier transform on the received optical signal, and the filter processors output a signal obtained by performing multiplication only on a predetermined part for the filter weight coefficient and the received optical signal.

2. The signal processing apparatus according to claim 1, wherein the filter processors perform multiplication on a portion corresponding to a component of a signal band in a frequency domain as the predetermined part.

3. The signal processing apparatus according to claim 1, wherein the output signal selector outputs a signal including components of every (m−1 index numbers in a case where an oversampling rate of the received optical signal is m.

4. A signal processing method performed by a signal processing apparatus including filter processors, the number of the filter processors depending on the number of spatial modes of a received optical signal, the signal processing method comprising:

outputting a sum of outputs of a plurality of the filter processors;

performing inverse Fourier transform on the sum;

outputting an output signal including only a predetermined part of an output of the inverse Fourier transform;

outputting, as an error signal, a difference between the output signal and a desired signal; and performing Fourier transform on signals including the error signal, wherein the filter processors update a filter weight coefficient by using a signal obtained by performing multiplication only on a predetermined part for a result obtained by performing Fourier transform on the signals including the error signal and a signal obtained by performing processing including Fourier transform on the received optical signal, and the filter processors output a signal obtained by performing multiplication only on a predetermined part for the filter weight coefficient and the received optical signal.

5. The signal processing apparatus according to claim 2, wherein the output signal selector outputs a signal including components of every (m−1) index numbers in a case where an oversampling rate of the received optical signal is m.

* * * * *